July 29, 1930. H. S. JANDUS 1,771,539
BUMPER CONSTRUCTION
Filed May 3, 1929
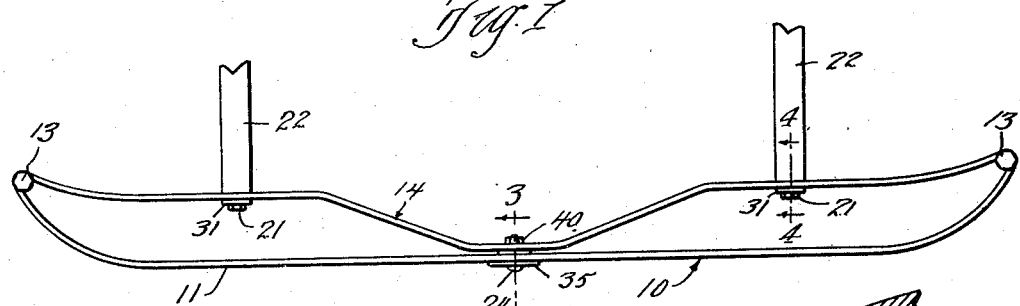
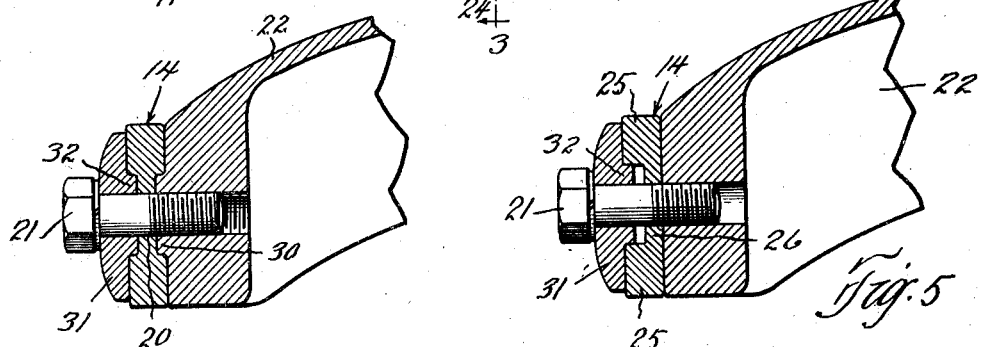
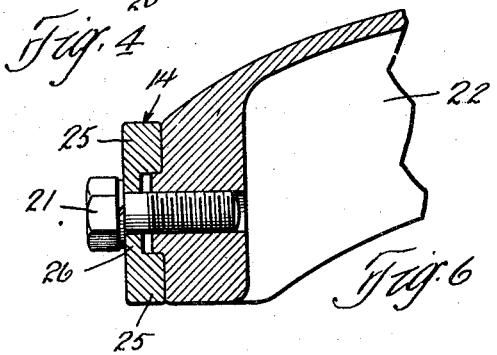
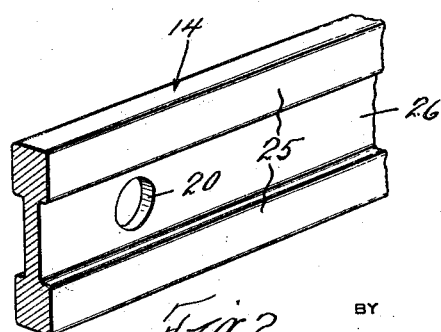
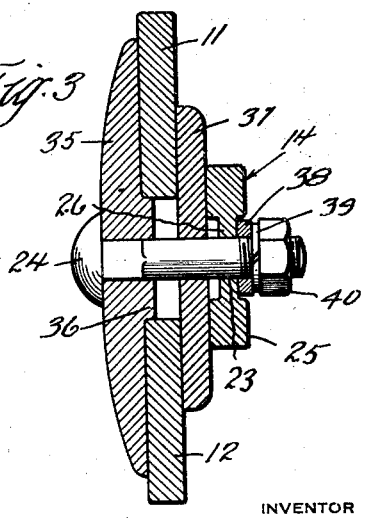
INVENTOR
Herbert S. Jandus
BY Hull, Brock & West
ATTORNEY Patented July 29, 1930

1,771,539

UNITED STATES PATENT OFFICE

HERBERT S. JANDUS, OF DETROIT, MICHIGAN, ASSIGNOR TO GENERAL SPRING BUMPER CORPORATION, A CORPORATION OF MICHIGAN

BUMPER CONSTRUCTION

Application filed May 3, 1929. Serial No. 360,122.

This invention relates to bumpers for vehicles and particularly to bumpers of the type wherein it is necessary to provide holes in the bars for securing them together or to the frame horns of the vehicle.

It has been found that where the bumper and particularly the back bar of a bumper made of flat bar material is provided with holes to receive the attaching screws or bolts, the bar is greatly weakened at those points. This type of mounting is, however, desirable in some cases and it is the object of my invention to provide a bumper, the bars of which may be of substantially the same weight as the bars heretofore used and which may be pierced to receive the securing bolts without materially decreasing the strength of the bumper at those points.

In the drawings Fig. 1 is a plan view of a bumper constructed in accordance with my invention, secured to the frame horns of a vehicle; Fig. 2 is a perspective view of a portion of the rear bar of the bumper; Fig. 3 is a sectional view taken on the line 3—3 of Fig. 1; Fig. 4 is a sectional view taken on the line 4—4 of Fig. 1; Fig. 5 is a sectional view similar to Fig. 4 showing a modified form of rear bar construction; and Fig. 6 is a similar view showing the same type of bar as shown in Fig. 5 when used with the flat side forward.

In describing my invention, reference is made to the accompanying drawing which forms a part of this specification and in which like reference numerals are used to designate like parts in the several views.

The embodiment of my invention illustrated in the accompanying drawing comprises a bumper having a front impact section 10 made up of two vertically spaced horizontal bars 11 and 12, the ends of which are curved rearwardly and connected by means of bolts 13 which extend through eyes at the ends of the bars to a back supporting bar 14 provided with eyes at its ends, in the manner shown and described in the patent to Jandus et al. No. 1,691,886, issued November 13, 1928.

The back bar 14, as illustrated, has its central portion bent forward into close proximity to the central portion of the front bars 11 and 12 to which it is secured.

The back bar 14, it will be noted, is provided with apertures 20 for the reception of screws 21 by which the bumper is secured to the frame horns 22 of the vehicle, and also with an aperture 23 at its central portion to receive the clamp bolt 24 which secures the back bar to the front bars.

When the back bar of the bumper is made of flat bar material, it is greatly weakened at the point where the apertures 20 and 23 are formed. To overcome this defect I provide a back bar of approximately the same weight as heretofore used, but so constructed that the bulk of the material is along the edges 25 of the bar leaving a relatively thin web or section at the center 26 as shown in the drawings. With such a construction the amount of material removed in providing the apertures 20 and 23 is relatively small. It has been found that such a bar is materially stronger than the same weight of bar of the ordinary flat section with similar holes punched therein.

In Figs. 2, 3 and 4 I have shown a bar 14 where the thin web 26 is in the center of the edge portions 25 providing a channel at each side. When so constructed, the frame horn of the vehicle may be formed with a boss 30 over which the bar 14 engages, and a clamp plate 31 provided with a similar boss 32 engaging in the front face of the bar and through which the screw 21 passes to hold the bumper rigidly to the frame.

In Figs. 5 and 6 a modified form of back bar is shown where the web 26 is flush with one side of the edge portions 25 in which case the bar may be turned with its plane side against the frame horn 22, in which case no boss on the same is necessary, and the clamp plate 31 the same as shown in Fig. 4, is used. With the plane side of the bar forward as illustrated in Fig. 6, the clamp plate 31 may, of course, be omitted.

In securing the central portions of the bars 11, 12 and 14 together, a front clamp plate 35 having a boss 36 on its rear face is provided, the boss 36 fitting between and spacing the bars 11 and 12 apart. A second flat clamp plate 37 is interposed between the bars 11 and 12 and the back bar 14 and the bolt 24 passed through aligned apertures in the clamp plates and back bar. Where the back bar is channeled on its rear face, an apertured filler block 38 is fitted in the channel on the bolt 24 to provide a bearing surface for the lock washer 39 and nut 40.

With the rear bar of the bumper constructed as described, a materially stronger bumper is provided than where flat bar material of the same weight is used. It is, of course, apparent that the bar section may be made in other shapes than rectangular as shown, as long as a relatively thin section is provided at the middle through which the bolt holes may be formed. The particular sections shown are preferred, however, because in rolling eyes at the ends of the bar the flat sections near the outer edges provide bearing surfaces for the end bolt of the bumper and facilitate the rolling of an eye of the proper form.

Having thus described my invention, what I claim is:

1. In combination with the frame horns of a vehicle having clamping faces to which the back bar of a bumper is adapted to be secured by bolt means passing directly through said bar, a bumper having a back bar provided with apertures through which said bolt means pass, said back bar being channel shape in section with the greater bulk of the material disposed along its edges, leaving a thin central web, said apertures being formed in the thin web portion of said bar, a clamp plate through which said bolt means passes arranged on the opposite side of the bar from the frame horn and provided with a clamping face, a boss on one of said clamping faces fitting into the channel in said bar whereby when the bolt means is tightened the bar is rigidly secured in place.

2. A vehicle bumper organization including vehicle frame horns having clamping faces, a bumper back bar having a longitudinal channel in each face thereof, and clamping means for holding said back bar in fixed relation to said horns, said clamping means including bosses on said horns adapted to fit into one of the channels of said bar and bolts passing through both said channels and threaded into said horns.

3. A vehicle bumper organization including vehicle frame horns having clamping faces, a bumper back bar having a longitudinal channel in each face thereof, and clamping means for holding said back bar in fixed relation to said horns, said clamping means including plates having bosses for engagement with one of said channels and bolts passing through said bosses and both said channels and threaded into said horns.

4. A vehicle bumper organization including vehicle frame horns having clamping faces, a bumper back bar having a longitudinal channel in each face thereof, and clamping means for holding said back bar in fixed relation to said horns, said clamping means including bosses on said horns adapted to fit into one of the channels of said bar, plates having bosses for engagement with the channel in the opposite side of said bar and bolts passing through all said bosses and channels and threaded into said horns.

In testimony whereof, I hereunto affix my signature.

HERBERT S. JANDUS.